(12) United States Patent
Mizushima et al.

(10) Patent No.: US 7,747,353 B2
(45) Date of Patent: Jun. 29, 2010

(54) METHOD OF SETTING CONTROL DATA IN AN ACTIVE VIBRATION ISOLATION CONTROL SYSTEM AND A CONTROL METHOD THEREOF

(75) Inventors: Daichi Mizushima, Anjo (JP); Takehiko Fushimi, Kariya (JP); Hiroyuki Ichikawa, Kani (JP); Atsushi Muramatsu, Komaki (JP)

(73) Assignee: Aisin Seiki Kabushiki Kaisha, Aichi-ken (JP)

( * ) Notice: Subject to any disclaimer, the term of this patent is extended or adjusted under 35 U.S.C. 154(b) by 907 days.

(21) Appl. No.: 11/060,701

(22) Filed: Feb. 18, 2005

(65) Prior Publication Data

US 2005/0184214 A1     Aug. 25, 2005

(30) Foreign Application Priority Data

Feb. 20, 2004   (JP) .............................. 2004-045157

(51) Int. Cl.
*G05B 15/00* (2006.01)
(52) U.S. Cl. ..................... 700/280; 73/1.82; 700/45; 700/89; 702/54; 702/56
(58) Field of Classification Search ................. 700/280, 700/28, 45, 89; 720/651, 688; 73/1.82, 35.09, 73/54.24, 862.41; 267/90.136–141.7; 702/54, 702/56; 335/87–98
See application file for complete search history.

(56) References Cited

U.S. PATENT DOCUMENTS

| | | | | |
|---|---|---|---|---|
| 4,546,426 A | * | 10/1985 | Hafner et al. ................. | 700/33 |
| 5,101,786 A | * | 4/1992 | Kamio et al. ................ | 123/399 |
| 5,386,372 A | * | 1/1995 | Kobayashi et al. ........... | 700/280 |
| 5,434,783 A | * | 7/1995 | Pal et al. ........................ | 701/36 |
| 5,758,311 A | * | 5/1998 | Tsuji et al. ................... | 701/111 |

(Continued)

FOREIGN PATENT DOCUMENTS

DE      43 33 384 A1     9/1999

(Continued)

OTHER PUBLICATIONS

Patent Abstracts of Japan, vol. 1999, No. 14, Dec. 22, 1999 & JP 11 259147 S (Tokai Rubber Ind Ltd), Sep. 24, 1999.

(Continued)

*Primary Examiner*—Paul L Rodriguez
*Assistant Examiner*—Carlos Ortiz Rodriguez
(74) *Attorney, Agent, or Firm*—Sughrue Mion, PLLC (57) ABSTRACT

A method of setting control data by an active vibration isolation control system includes the steps of selecting, when a frequency of a pulse signal actually detected is superior to a predetermined frequency, appropriate control data selected from among predetermined data maps incorporating control data capable of securing, in accordance with various vehicle driving conditions respectively, a control condition in which operation of the vibrator is preferably controlled, calculating a deviation between the appropriate control data commensurate with the actual vehicle driving condition at the time of controlling and actually detected data representing vibration subjected to a vehicle specific position, the actually detected data obtained in terms of a same physics amount as a physics amount of the control data, and modifying the appropriate control data on the basis of the calculated deviation.

8 Claims, 4 Drawing Sheets

U.S. PATENT DOCUMENTS

| | | | |
|---|---|---|---|
| 5,792,948 A * | 8/1998 | Aoki et al. | 73/116 |
| 5,912,821 A * | 6/1999 | Kobayashi | 700/280 |
| 5,939,625 A * | 8/1999 | Torii et al. | 73/118.1 |
| 5,950,756 A * | 9/1999 | Satoh et al. | 180/312 |
| 6,010,120 A * | 1/2000 | Nagasawa | 267/140.14 |
| 6,018,689 A * | 1/2000 | Kumura et al. | 700/280 |
| 6,186,485 B1 * | 2/2001 | Kawazoe | 267/140.14 |
| 6,189,873 B1 * | 2/2001 | Aoki | 267/140.14 |
| 6,254,069 B1 * | 7/2001 | Muramatsu et al. | 267/140.14 |
| 6,256,545 B1 * | 7/2001 | Kimura et al. | 700/28 |
| 6,459,970 B2 * | 10/2002 | Goto et al. | 701/36 |
| 7,071,638 B2 * | 7/2006 | Yasui et al. | 318/135 |
| 2004/0010389 A1 * | 1/2004 | Makino et al. | 702/127 |
| 2005/0187692 A1 | 8/2005 | Ichikawa et al. | |

FOREIGN PATENT DOCUMENTS

| | | |
|---|---|---|
| JP | 6-185568 A | 7/1994 |
| JP | H08-093842 A | 4/1996 |
| JP | 1999/H11)-259147 A | 9/1999 |
| JP | 2001-003984 A | 1/2001 |
| JP | 2002-052941 A | 2/2002 |
| JP | 2003-113892 A | 4/2003 |
| JP | 2003-195950 A | 7/2003 |
| JP | 2003-202902 A | 7/2003 |

OTHER PUBLICATIONS

Microfilm of Japanese Utility Model Application No. S59-120594 (Japanese Utility Model Application No. S61-035030, Mar. 4, 1996.

* cited by examiner

METHOD OF SETTING CONTROL DATA IN AN ACTIVE VIBRATION ISOLATION CONTROL SYSTEM AND A CONTROL METHOD THEREOF

CROSS REFERENCE TO RELATED APPLICATIONS

This application is based on and claims priority under 35 U.S.C. §119 with respect to Japanese Patent Application 2004-045157, filed on Feb. 20, 2004, the entire content of which is incorporated herein by reference.

FIELD OF THE INVENTION

This invention generally relates to a control method in an active vibration isolation control system. More particularly, this invention pertains to a method of setting control data in an active vibration isolation control system, in which, by applying, to an active mount such as a mount attached with a vibrator mounted on a vehicle, a periodical pulse signal emanating from a vehicle vibration-producing source, vibration transmitted to a vehicle body is attenuated, and a control method thereof.

BACKGROUND

As a conventionally known, active vibration isolation control system, JP2003-113892A (Reference 1) discloses a method of controlling a vibrator attached at an engine mount. To be more precise, in this disclosed method, a crank pulse sensor, which is equipped at an engine as a vibration-producing source, detects a crank pulse output with a rotation of a crankshaft of the engine. Driving torque from the engine is calculated on the basis of the crank pulse output detected by the crank pulse sensor. The calculation of the driving torque from the engine involves obtaining amplitude of vibration emanating from the engine. When the extent of the amplitude is inferior to a set amplitude value, operation of the vibrator attached at the engine mount is controlled on the basis of the amplitude obtained as described above and a predetermined phase. On the other hand, when the extent of the amplitude is, equal to, or greater than, the set amplitude value, phase of the vibration emanating from the engine is calculated on the basis of phase in an event that the engine torque reaches the maximum level. The operation of the vibrator is then controlled on the basis of the amplitude obtained as described above and the phase calculated as described above.

JP2003-195950A (Reference 2) and JP2003-202902A (Reference 3) respectively disclose method of performing a so-called adaptive control by active vibration isolation control systems. As algorithms for the adaptive control, these methods respectively employ an adaptive Lean-Mean-Square filter (hereinafter, referred to a Filter-XLMS) and a Delayed-X Harmonics Synthesizer Least-Mean-Square filter (hereinafter, referred to as DXHS LMS). In order to implement the adaptive control, the system disclosed in each Reference 2 and 3 incorporates the Filter-XLMS or the DXHS LMS, and an adaptive filter. Each of the Filter-XLMS and the DXHS LMS serves for obtaining coefficients, each of which modifies or compensates for amplitude and phase, while the adaptive filter serves for modifying or compensating for the amplitude and phase. Accordingly, control data for isolating vibration can be generated. Therefore, as described above, these methods of performing the adaptive control can be implemented preferably commensurate with an actual condition of a controlled object with high adjustability.

Being different from the adaptive control described above, JP11 (1999)-259147A (Reference 4) discloses a method of performing a map control by an active vibration isolation control system. In this conventional map control, control maps (data maps) have been prepared, control maps which store control data whereby a preferable control condition can be secured in response to a vehicle driving condition. The active vibration isolation control system reads a control data which is adequate to an actual vehicle driving condition at the time, and sends the control data to a vibrator. This map control can be carried out with superior responsibility.

According to any of the conventional methods disclosed in the above four references, a single control method is employed irrespective of a vehicle driving condition, i.e., irrespective of an engine rotational speed.

Points to be improved relevant to the method disclosed in Reference 1

In Reference 1, two types of control methods are selectively switched: the first control method whereby the operation of the vibrator is controlled on the basis of the phase of the engine vibration, the phase which is estimated by the engine crank pulse; and the second control method whereby the operation of the vibrator is controlled on the basis of the predetermined phase. In such circumstances, at an event that there is a difference or error between the estimated value (amplitude, phase) and actual value (amplitude, phase), or there is a difference or error between the predetermined value (amplitude, phase) and the actual value (amplitude, phase), preferable vibration isolation performance cannot be always exerted.

As far as vehicle vibration is concerned, at a time that the engine has been idly activated at a relatively low engine rotational speed, vibration apart from the engine rotation is so minor as to be insignificant. In such circumstances, the vehicle driver or occupant may be, on occasions, directly and strongly subjected to the vibration due to the engine rotation, whereby further improvements may be given preferably in a driving feeling that the vehicle driver or occupant may have. On the other hand, at a time that the engine has been activated at a relatively high engine rotational speed, various types of vehicle driving conditions may influence on the level of vibration that the vehicle driver or occupant may be subjected to. In such circumstances, requirements may lead to an active vibration isolation control with improved adjustability.

Points to be Improved Relevant to the Method Disclosed in References 2 and 3

In order to perform the adaptive control, the active vibration isolation control system monitors, as appropriate, a condition of the controlled object, and generate control data to be adequate to an actual condition. The vibrator is operated in response to the control data. In such circumstances, responsibility of the adaptive control may not be attained to a sufficient level. For example, at a time that the engine has been idly activated at a relatively low engine rotational speed, vibration to be transmitted to the vehicle driver or occupant may not be, on occasions, isolated at a sufficient level.

Points to be Improved Relevant to the Method Disclosed in Reference 4

In order to perform the map control, the predetermined control maps are employed. In such case, the number of control maps, which the system can store, is limited. Therefore, the map control may not be, on occasions, performed with a sufficient adjustability, especially in an event that many elements, which produce vibration, should be considered for the purpose of obtaining a vehicle driving condition. Moreover, when the system is subjected to an influence of temperature changes at the large extent, such as when an engine unit has not been warmed up yet, it may be, on occasions, difficult for the predetermined control maps to be adjusted in response to the changes of influence amount. Likewise, when a vibration transfer function has changed across the ages, it may be, on occasions, difficult for the predetermined control maps to be adjusted in response to the changes of influence amount.

The present invention has been made in view of the above circumstances, and provides a method of setting control data capable of preferably attaining an active vibration isolation control from a time when an engine is activated idly to a time when a vehicle drives at a relatively high engine rotational speed, whereby a driver or occupant does not have much discomfort. More over, the present invention provides a control method of controlling the same.

SUMMARY OF THE INVENTION

According to an aspect of the present invention, a method of setting control data by an active vibration isolation control system for attenuating vehicle vibration by applying, to an active mount attached with a vibrator mounted on a vehicle, a periodical pulse signal emanating from a vehicle vibration-producing source includes the steps of: setting the control data by use of an adaptive control algorithm when a frequency of the pulse signal actually detected is higher than a predetermined frequency; selecting, when the frequency of the pulse signal actually detected is, equal to, or, lower than, the predetermined frequency, appropriate control data commensurate with an actual vehicle driving condition at a time of controlling, from among predetermined data maps incorporating control data capable of securing, in accordance with various vehicle driving conditions respectively, a control condition in which operation of the vibrator is preferably controlled; calculating a deviation between the appropriate control data commensurate with the actual vehicle driving condition at the time of controlling and actually detected data representing vibration subjected to a vehicle specific position, the actually detected data obtained in terms of a same physics amount as a physics amount of the control data; and modifying the appropriate control data on the basis of the calculated deviation, wherein the control data is set on the basis of the appropriate control data modified.

According to another aspect of the present invention, a method of setting control data by an active vibration isolation control system for attenuating vehicle vibration by applying, to an active mount attached with a vibrator mounted on a vehicle, a periodical pulse signal emanating from a vehicle vibration-producing source includes the steps of: setting the control data by use of an adaptive control algorithm when a frequency of the pulse signal actually detected is higher than a predetermined frequency; selecting, when the frequency of the pulse signal actually detected is, equal to, or, lower than, the predetermined frequency, appropriate control data commensurate with an actual vehicle driving condition at a time of controlling, from among predetermined data maps incorporating control data capable of securing, in accordance with various vehicle driving conditions respectively, a control condition in which operation of the vibrator is preferably controlled; calculating a deviation, relative to the adequate control data commensurate with the actual vehicle driving condition at the time of controlling, of actually detected data representing vibration subjected to a vehicle specific position, the actually detected data obtained in terms of a same physics amount as a physics amount of the control data and actually detected data of a control signal applied to the vibrator; and modifying the appropriate control data on the basis of the calculated deviation, wherein the control data is set on the basis of the appropriate control data modified.

BRIEF DESCRIPTION OF THE DRAWINGS

The foregoing and additional features and characteristics of the present invention will become more apparent from the following detailed description considered with reference to the accompanying drawings, wherein.

DETAILED DESCRIPTION

An embodiment of the present invention will be described hereinbelow in detail with reference to the accompanying drawings. Certain terminology is used herein for convenience only and is not to be taken as a limitation on the invention. For example, words such as "upper", "lower", "left", "right", "horizontal", "vertical", "upward", "downward", "clockwise", and "counter-clockwise" merely describe the configuration shown in the Figures. An active vibration isolation control system 1 according to the embodiments of the present invention possesses a control structure effective for selectively determining a control method between an adaptable map control and an adaptive control. The active vibration isolation control system 1 generates, during implementation of the adaptive control, data maps incorporated with parameter values that appear in an event that vibration have been effectively isolated.

1. Active Vibration Isolation Control System 1-1 Overall Structure

Figure 1:
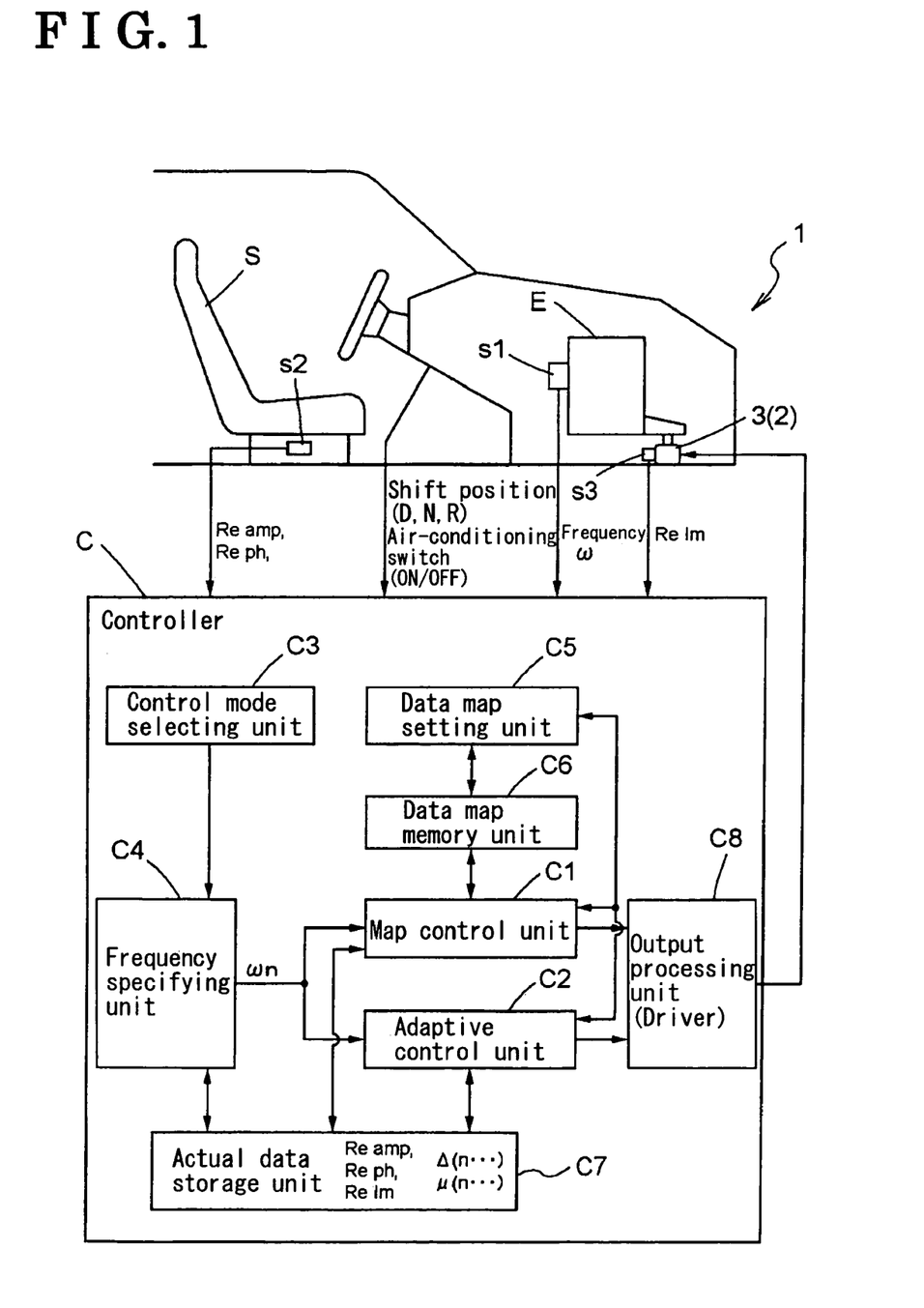
FIG. 1 is a block view schematically illustrating a structure of an active vibration isolation control system 1 whereby a control method according to an embodiment of the present invention is performed.

In general, vibration, which emanate from an engine E serving as a vibration-producing source, may be transmitted to a seat S (i.e., vehicle specific position) illustrated in FIG. 1. The active vibration isolation control system 1 according to the embodiment of the present invention is mounted on a vehicle, inter alia, for the purpose of inhibiting vibration of the engine E from causing discomfort to a vehicle driver or occupant. In the active vibration isolation control system 1, a vibrator 2 is attached at an engine mount 3 supporting the engine E mounted thereon. By operating the vibrator 2 in a proper manner on the basis of output of command signals from a control device C, it is possible to secure predetermined effects in isolating vibration. As illustrated in FIG. 1, the control device C incorporates, therein, a map control unit C1 adapted to perform the adaptable map control, and an adaptive control unit C2 capable of performing the adaptive control.

1-2 Detecting System

The active vibration isolation control system 1 is further provided with a rotational speed detector s1 for detecting an engine rotational speed of the engine E, a pickup acceleration sensor s2 equipped at a bottom portion of the seat S and a current detector s3 for detecting current actually supplied to the vibrator 2. As the rotational speed detector s1, detectors, such as a rotational speed sensor for detecting a rotational speed of a crankshaft in the form of pulses, and a signal transmitting system for transmitting an ignition pulse signal, are represented. In the active vibration isolation control system 1 with the aforementioned configuration, at least following factors can be detected: an engine rotational frequency $\omega$, a frequency detected by the rotational speed detector s1; actual vibration at the bottom portion of the seat S, actual vibration detected by the pickup acceleration sensor s2; and a value of current actually supplied to the vibrator 2, a value of current detected by the current detector s3. The actual vibration at the bottom portion of the seat S is expressed in terms of voltage and is denoted by actual amplitude Re_amp and actual phase Re_ph. The value of current actually supplied to the vibrator 2 is expressed in terms of electric current and is denoted by actual current amplitude Re_Im. These factors are fed into the control device C and recognized therein.

Input into the control device C also includes shift positions in a transmission (not shown), shift positions such as a forward shift position D, a neutral shift position N and a reverse shift position R, and on-and-off states of an air-conditioning switch (not shown).

Therefore, on the basis of a given engine rotational frequency $\omega$, any shift position (D, N and R) and any on-and-off state of the air-conditioning switch, a current vehicle driving condition, i.e., a vehicle driving condition at a time when either the adaptive control or the adaptable map control is implemented, can be identified and specified.

In this active vibration isolation control system 1, the engine rotational frequency as is employed so as to selectively determine, as the control method, either the adaptable map control or the adaptive control, and is further employed so as to specify a specific frequency $\omega n$ which is referred to for the purpose of effectively setting in motion an active control for isolating vibration.

Meanwhile, on the basis of the engine rotational frequency $\omega$, specifically the specific frequency $\omega n$, any shift position (D, N and R) and any on-and-off state of the air-conditioning switch, when the adaptable map control is performed, appropriate control data can be selected and specified from among data maps.

1-3 Engine Mount

The engine mount 3 is a so-called mount attached with a vibrator and serves as an active mount. As is apparent from FIG. 2, in the engine mount 3, a vibration-isolating rubber 32 and the vibrator 2 are housed in an approximately cylindrically shaped case 31. The vibrator 2, which is an electromagnetically driven-type actuator, is positioned below the vibration-isolating rubber 32. A bottom portion of the vibration-isolating rubber 32 is fixed at an inner wall of the case 31, while an upper portion thereof is attached to a fixing bracket 34. The vibration-isolating rubber 32 is integrally provided with a stopper portion 32a, which extends in a direction of one end of the case 31, i.e., upward in FIG. 2, in such a manner as to accommodate the fixing bracket 34 therein.

Figure 2:
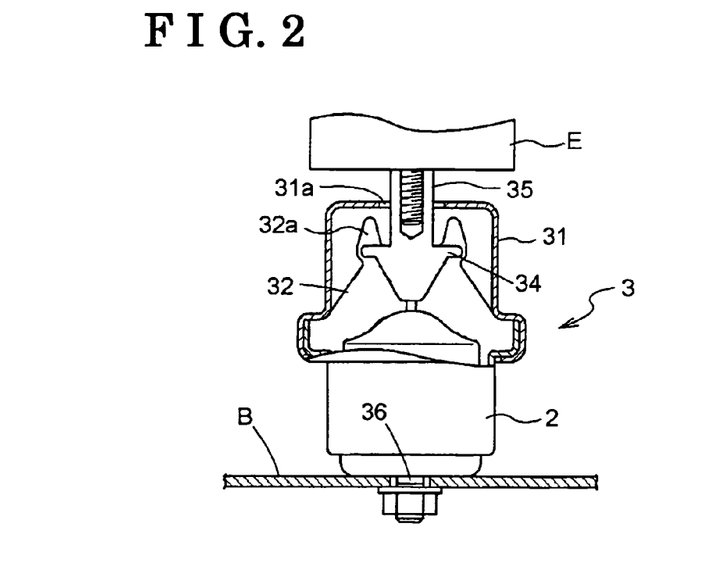
FIG. 2 is a sectional view illustrating a cross section of an engine mount attached with a vibrator serving as a controlled object according to the embodiment of the present invention.

A fixing shaft 35 is placed at an approximately axially central position at an upper side of the fixing bracket 34, as seen in FIG. 2. A tip end of the fixing shaft 35 projects through a penetrating hole 31a defined at one upper side of the case 31. A hole diameter of the penetrating hole 31a is designed to be superior to an axial diameter of the fixing shaft 35, thereby effectively avoiding interference between the case 31 and the fixing shaft 35. Meanwhile, at a lower side of the case 31, a fixing shaft 36 is provided.

The engine mount 3 is fixedly mounted at a vehicle body B by means of the fixing shaft 36. The Engine mount 3 supports the engine E fixed at the fixing shaft 35. As a result, by activating, on the basis of the output of commands from the control device C, the vibrator 2 at a degree commensurate with the level of vibration transmitted to the fixing bracket 34 from the engine E, i.e., by activating the vibrator 2 at a degree so as to offset or counteract vibration transmitted to the fixing bracket 34 from the engine E, it is possible to reduce the extent of the influence of vibration to be imposed on the seat S.

1-4 Control Device

The control device C incorporates a generally used central processing unit (abbreviated to CPU), the map control unit C1 and the adaptive control unit C2. As illustrated in FIG. 1, the control device C further incorporates a control method determining unit C3, a frequency specifying unit C4, a data map setting unit C5, a data map memory unit C6, an actual data storage unit C7 and an output processing unit C8.

Control Method Determining Unit C3

The control method determining unit C3 selectively determines, on the basis of the engine rotational frequency $\omega$, as the appropriate control method, either the adaptable map control or the adaptive control. In detail, when the engine rotational frequency $\omega$ is equal to, or less than, a predetermined frequency, the map control unit C1 is operated, as a primary control unit, for the purpose of carrying out the adaptable map control. On the other hand, when the engine rotational frequency $\omega$ is superior to the predetermined frequency, the adaptive control unit C2 is operated, as a primary control unit, for carrying out the adaptive control. According to the embodiment of the present invention, the predetermined frequency is set, as a non-limiting example, at a predetermined frequency level within a range between 40 Hz and 65 Hz, and preferably substantially at 50 Hz.

In general, characteristics of vibration to be subjected to a vehicle driver or occupant vary commensurate with a level of a rotational speed of a crankshaft of the engine E as the vibration-producing source. For example, when the crankshaft has rotated idly, i.e., when a relatively low level of frequency of vibration is subjected to the vehicle driver or occupant, an algorithm approach on the basis of the appropriate control data excellent in responsibility, i.e., the adequate map control according to the present invention is employed as a primary control algorithm approach. In such circumstances, vibration isolation can be carried out with high responsibility, whereby effectively avoiding discomfort which the driver or occupant may have. On the other hand, when the crankshaft has rotated at a higher speed level, i.e., when a relatively high level of frequency of vibration is subjected to the vehicle driver or occupant, various factors can be considered as influences causing vehicle vibration. In such circumstances, it seems to be difficult, in view of the number of maps and generation thereof, to perform a control on the basis of control maps. Therefore, it is preferable to perform the adaptive control in this case.

In light of the foregoing, according to the embodiment of the present invention, over a range from the relatively low frequency range to the relatively high frequency range, an active vibration isolation control can be preferably implemented commensurate with vehicle driving condition. As a result, a vehicle driver or occupant is not subjected very much to engine vibration even during an idling condition, wherein engine vibration becomes so minor as to be insignificant.

Frequency Specifying Unit C4

Irrespective of whether the control method adopted at the time is, the adaptable map control or the adaptive control, the frequency specifying unit C4 specifies, as the specific frequency ωn, a frequency to be controlled, i.e., a frequency which is considered to possess the potential to produce the best effect, i.e., the potential to produce the best control results. Further, the frequency specifying unit C4 feeds a signal representing this specific frequency ωn to the downstream control system. In concrete terms, in consideration of the engine rotational speed frequencies ω, in manner of pulses, detected by the rotational speed detector s1, the frequency specifying unit C4 specifies, as the specific frequency ωn, a frequency which is considered to be most effective for implementing an active vibration isolation control. Moreover, the frequency specifying unit C4 feeds a signal representing this specific frequency ωn in manner of a sine wave to the downstream control system.

Data Map Setting Unit C5

The data map setting unit C5 acts to generate and set, initially, or as appropriate, data maps required for implementing the adaptable map control. The data map, which is generated and set on the basis of the vehicle driving condition, is memorized at the data map memory unit C6, and is employed when the adaptable map control is carried out.

Data Map Memory Unit C6

The data map memory unit C6 has memorized in advance control data (either voltage amplitude or electric current amplitude, and phase) to be output to the vibrator 2, control data whereby vibration attenuation can be preferably secured at the seat S. The amplitude, either voltage amplitude or electric current amplitude, is mapped in accordance with plural engine rotational speed frequencies ω, shift positions (D, N and R) and on-and-off states of the air-conditioning switch, and likewise each phase thereof is mapped. When the adaptable map control is carried out, appropriate control data (MAP_amp, MAP_ph and MAP_Im) is selected and determined, in response to an actual vehicle driving condition, from among the predetermined control data. Namely, the appropriate control data (MAP_amp, MAP_ph and MAP_Im) represents control data appropriate to the circumstances at that time.

Actual Data Storage Unit C7

The actual data storage unit C7 stores the current engine rotational frequency ω detected by the rotational speed detector s1, actual amplitude Re_amp and the actual phase Re_ph, both detected by the pickup acceleration sensor s2, and the actual current amplitude Re_Im detected by the current detector s3. Moreover, the actual data storage unit C7 stores a current deviation Δ and past deviations Δ(n−1, n−2 ... ), and a current compensation filter coefficient μ and past compensation filter coefficients μ(n−1, n−2 ... ). The compensation filter coefficient μ is employed when compensated appropriate control data is needed, in consideration with the deviation Δ. The compensation filter coefficient μ can be variable. In such case, it is possible to select and employ a filter coefficient adequate to a vehicle driving condition when the appropriate control data is required to be modified or compensated, whereby preferable control can be implemented.

Output Processing Unit C8

The output-processing unit C8 is a driver adapted to transform the generated control data to a signal form that can suit to an operation of the vibrator 2.

Next, the following is an explanation of the adaptable map control, the adaptive control and data map generated during the course of the adaptive control.

1-4-1 Adaptable Map Control

Figure 3:
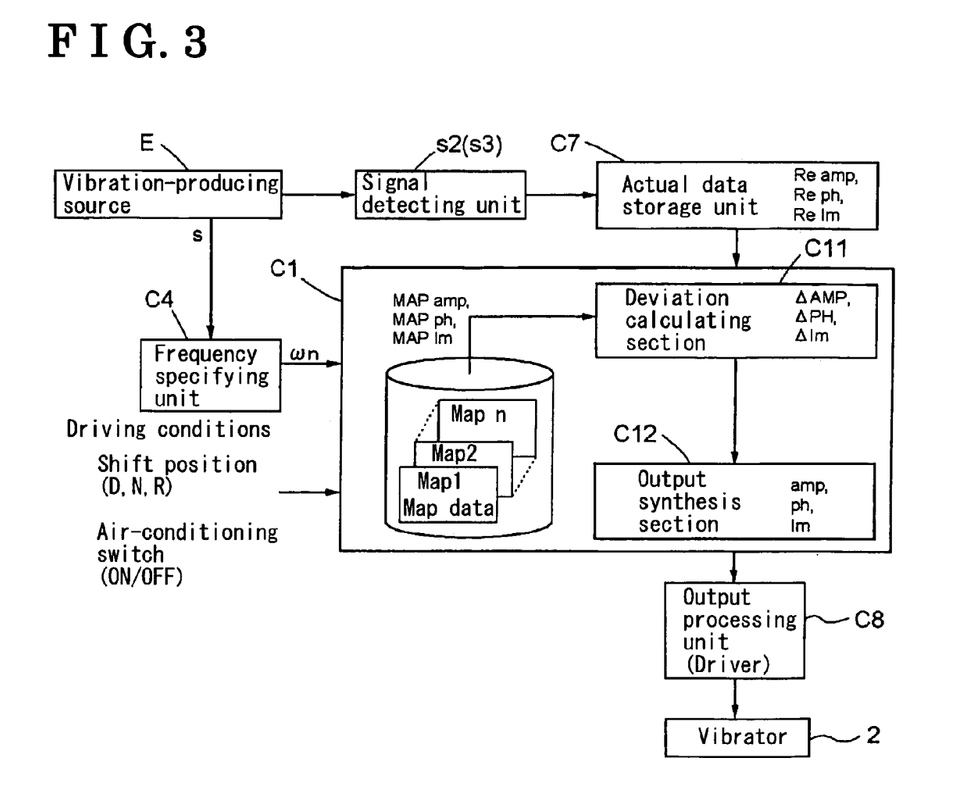
FIG. 3 is a block view schematically illustrating a system for performing an adaptable map control according to the embodiment of the present invention.

As is summarized in FIG. 3, the vibration-producing source corresponds to the engine E, a signal detecting unit corresponds to the pickup acceleration sensor s2 for detecting the actual amplitude Re_amp and the actual phase Re_ph and the current detector s3 for detecting the actual current Re_Im. The engine rotational frequency a, the actual amplitude Re_amp, the actual phase Re_ph and the actual current Re_Im are respectively input to the map control unit C1. Likewise, other vehicle driving conditions such as, shift positions (D, N and R) and on-and-off states of the air-conditioning switch are input to the map control unit C1. In the map control unit C1, data maps, which have been stored at the data map memory unit C6, is employed.

As is obvious from FIG. 3, the map control unit C1 incorporates a deviation calculating section C11 and an output synthesis section C12. The deviation calculating section C11 calculates, on the basis of amplitude actually detected (the actual amplitude Re_amp and the actual current Re_Im), the actual phase Re_ph and an actual vehicle driving condition, a deviation Δ between the actual amplitude Re_amp and the specified appropriate control data MAP_amp, a deviation Δ denoted by ΔAMP; a deviation Δ between the actual current Re_Im and the specified appropriate control data MAP_Im, a deviation Δ denoted by ΔIm; and a deviation Δ between the actual phase Re_ph and the specified appropriate control data MAP_Im, a deviation Δ denoted by ΔPH. Taking into consideration the appropriate control data adopted and the deviations Δ, the output synthesis section C12 calculates the compensated or modified appropriate control data (amp, ph and Im).

In the above-described process of obtaining deviations and calculating compensated appropriate control data, when the vibrator 2 is subjected to the control data (amp, ph), in terms of voltage, both the actual amplitude Re_amp and the actual phase Re_ph are employed in such a manner as to calculate the deviations ΔAMP and ΔPH, and as to modify the control data (amp, ph). On the other hand, when the vibrator 2 is subjected to the control data (Im, ph), in terms of current, only the actual phase Re_ph is employed. With regard to the control data Im, the actual current Re_Im is employed, which is supplied to the vibrator 2. Therefore, the deviations ΔIm and ΔPH can be calculated, and the control data (Im, ph) can be modified.

The compensated, appropriate control data described above is obtained by modifying or compensating for, on the basis of the deviations, the appropriate control data determined solely from the data maps. In practical terms, the compensated, appropriate control data is obtained, on the basis of data actually detected, by interpolating the plural data maps. Namely, according to the embodiments of the present invention, using the deviations in the course of implementing the adaptable map control preferably is tantamount to compensation for the adjustability that constitutes weakness of the conventional map control algorithm.

Output Form of Control Data

The control data (amp, Im and ph) generated and synthesized at the output synthesis section C 12 is output to the vibrator 2 through the output processing unit C8. When the control device C sends a signal of a command in terms of electric current to the vibrator 2, an output form y of the control data is determined by Formula (A) with "Im" as an electric current amplitude and "ph" as a phase thereof:

$$y = Im \times \sin(\omega n \times t + ph) \quad (A)$$

On the other hand, when the control device C sends a signal of a command in terms of voltage to the vibrator 2, an output form y of the control data is determined by Formula (B) with "amp" as a voltage amplitude and "ph" as a phase:

$$y = amp \times \sin(\omega n \times t + ph) \quad (B)$$

In the above Formulae (A) and (B), the variable On represents the specified frequency ωn specified at the frequency specifying unit C4, and the variable t represents a period of time.

Deviation Calculating Section C11 and Output Synthesis Section C12

Operation of each of the deviation calculating section C11 and the output synthesis section C12 is explained below on the basis of an example in which the command signal is sent in terms of electric current from the control device C to the vibrator 2. Any control data is expressed in the single form of (amplitude, phase). A time step is expressed by a variable "n". Suffixes such as "n+1" and "n+2" represent progression in time, while suffixes such as "n−1" and "n−2" represent retrogression in time. Any control data without any such suffix corresponds to control data at a current point in time.

a: Generation of a Synthesized Signal

Any synthesized signal is generated in accordance with the following four algorithm approaches: a first algorithm approach whereby appropriate control data and deviations are applied; a second algorithm approach whereby past values are applied; a third algorithm approach whereby the filter coefficient μ is set for each past value; and a fourth algorithm approach whereby an weighted mean of deviations is applied. In whichever algorithm approach, appropriate control data (MAP_Im, MAP_ph) is selected and specified in accordance with an actual vehicle driving condition, from among the data maps. A deviation Δ is obtained between the appropriate control data (MAP_Im, MAP_ph) and actual data (Re_Im, Re_ph) at the deviation calculating section C11. At the output synthesis section C12, the compensation filter coefficient μ on the basis of the deviation is added into the appropriate control data (MAP_Im, MAP_ph), whereby obtaining the compensated appropriate control data. This compensated or modified appropriate control data is applied as control data to be transmitted to the vibrator 2.

First Algorithm Approach

The control data (Im, ph) is obtained at the output synthesis section C12 by Formula (1):

$$\text{Current: } Im(n+1) = MAP\_Im - \mu \times \Delta Im, \text{ and}$$

$$\text{Phase: } ph(n+1) = MAP\_ph - \mu \times PH \quad (1)$$

In the above Formula (1), the variable μ represents the compensation filter coefficient. This compensation filter coefficient μ is normally set at substantially 0.2 or less than that, as a non-limiting example. The deviations ΔIm and ΔPH, which have been calculated at the deviation calculating section C11, are expressed by the following formulae:

$$\Delta Im = MAP\_Im - Re\_Im, \text{ and } \Delta PH = MAP\_ph - Re\_ph.$$

As described above, the current amplitude Im(n+1) and its phase ph(n+1) are generated by modifying or compensating for the predetermined control data by the actually detected current and the actually detected phase.

The above-described algorithm approach is relatively simple and easy to implement, and yet the following algorithm approaches can be employed for the purpose of obtaining control data. The past values employed according to the second, third and fourth algorithm approaches have been stored at the actual data storage unit C7.

Second Algorithm Approach

The control data (Im, ph) is calculated at the output synthesis section C12 by Formula (2):

$$\text{Current: } Im(n+1) = MAP\_Im - \mu \times \Delta Im(n-1) - \mu \times \Delta Im(n-2), \text{ and}$$

$$\text{Phase: } ph(n+1) = MAP\_ph - \mu \times \Delta PH(n-1) - \mu \times \Delta PH(n-2) \quad (2)$$

The process of calculating the deviations at the deviation calculating section C11 is performed in the same manner as the first algorithm approach.

Third Algorithm Approach

The control data (Im, ph) is calculated at the output synthesis section C12 by Formula (3):

$$\text{Current: } Im(n+1) = MAP\_Im - \mu(n-1) \times \Delta Im(n-1) - \mu(n-2) \times \Delta Im(n-2) \ldots, \text{ and}$$

$$\text{Phase: } ph(n+1) = MAP\_ph - \mu(n-1) \times \Delta PH(n-1) - \mu(n-2) \times \Delta PH(n-2) \quad (3)$$

The process of calculating the deviations at the deviation calculating section C11 is implemented in the same manner as the first algorithm approach. Each filter coefficient μ(n−1), μ(n−2) . . . is set individually every time step n.

Fourth Algorithm Approach

The control data (Im, ph) is calculated at the output synthesis section C12 by Formula (4):

$$\text{Current: } Im(n+1) = MAP\_Im - \{\mu \times \Delta Im(n-1) + \mu \times \Delta Im(n-2) \ldots\}/N, \text{ and}$$

$$\text{Phase: } ph(n+1) = MAP\_ph - \{\mu \times PH(n-1) + \mu \times \Delta PH(n-2) \ldots\}/i\, N \quad (4)$$

The process of calculating the deviations at the deviation calculating section C11 is implemented in the same manner as the first algorithm approach. According to the fourth algorithm approach, the weighted mean of the deviations over the past N times is employed, whereby compensating for the appropriate control data.

According to the embodiment of the present invention, in order to compensate for the appropriate control data, only actually detected data of vibration at a monitoring point is employed, or both the actually detected data of vibration at the monitoring point and actually detected data representing an operation signal such as control electric current supplied to the vibrator 2 are employed. In such case, the control data outputted from the controller C can compensate, on the basis of the actually detected data and deviation, for the appropriate control data commensurate with an actual vehicle driving condition. Therefore, it is possible to obtain the control data that is further adequate to the actual condition for implementing active vibration isolation control. Moreover, it is possible to perform the adaptable map control characteristic to the embodiment of the present invention.

That is, even when the crankshaft has idly rotated, and an engine unit has not been warmed up sufficiently, the system may be influenced by temperature. Even in such circumstances, control adequate to the condition can be performed. Further, even when a vibration transmission system has varied over the ages, it is possible to perform a control method adequate to this sort of condition.

As described above, in order to perform the adaptable map control according to the embodiment of the present invention, data, which is generated by modifying or compensating for appropriate control data by use of data actually detected, is employed as compensated appropriate control data. In such circumstances, it is preferable that compensating for appropriate control data be performed within a period of time required for a conventional map control, plus 10% of the period of time. Accordingly, the adaptable map control according to the embodiment of the present invention can be performed without damaging responsibility.

1-4-2 Adaptive Control

Figure 4:
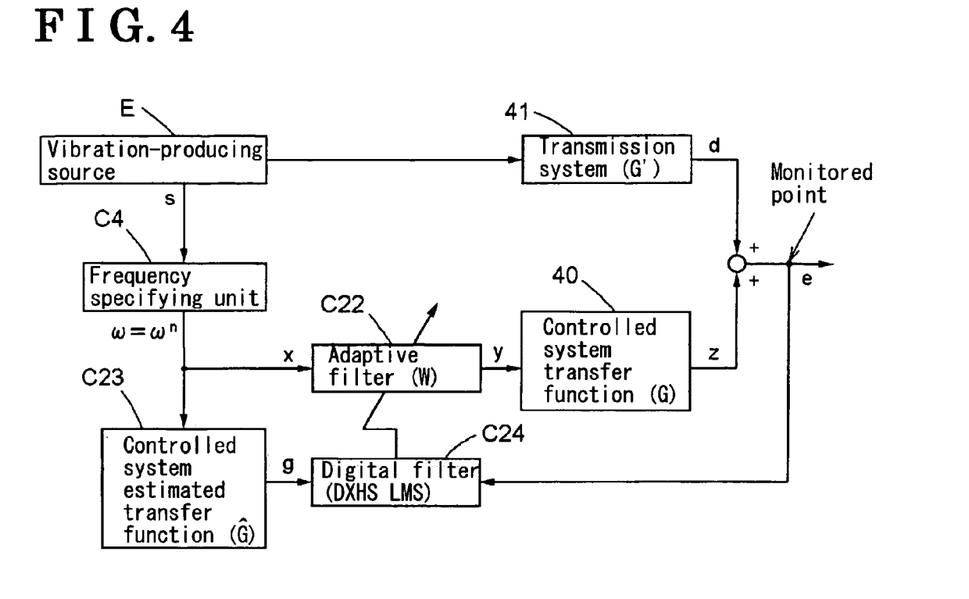
FIG. 4 is a block view schematically illustrating a control algorithm for performing an adaptive control according to the embodiment of the present invention.

As is summarized in FIG. 4, the structures and functions of the vibration-producing source E and the frequency determining unit C4 are the same as those illustrated in FIG. 1.

A preferred method of performing the adaptive control according to the embodiment of the present invention employs a Delayed-X Harmonics Synthesizer Least-Mean-Square filter (hereinafter, referred to as a DXHS_LMS filter) algorithm approach.

In this control method, the frequency specifying unit C4 selects and specifies, on the basis of the engine rotational speed frequencies $\omega$, the specific frequency $\omega n$ to be controlled. The specific frequency $\omega n$ is input, in the form of a sine-wave input signal x, to an adaptive filter C22 from the frequency specifying unit C4. The adaptive filter C22 is designed to have a filter coefficient for modifying or compensating for amplitude and its phase of the input signal x. The input signal x is then synthesized at the adaptive filter C22 and is output in the form of a sine-wave output signal y. The output signal y passes through a transmission path 40 of the controlled system (i.e., the vibrator 2) possessing a transfer function G and is output in the form of a processed signal z.

In the meantime, vibration of the engine E is transmitted to a different transmission path 41 possessing a transfer function G' and is output in the form of an external force d, wherein a value generated by adding the external force d into the processed signal z is monitored at a monitoring point. A target monitored value at this monitoring point is zero. A difference between the target monitored value and the value on the basis of the processed signal z and the external force d is denoted by an error signal e. An estimated transfer function C23 of the controlled system (i.e., the vibrator 2) is expressed by an estimated value $\hat{G}$. The filter coefficient of the adaptive filter C22 is updated, as appropriate, on the basis of the error signal e and the estimated value $\hat{G}$, by use of a digital filter C24 which uses the DXLS_LMS algorithm approach.

Therefore, in the adaptive control according to the embodiment of the present invention, the updated filter coefficient of the adaptive filter C22 is employed as a parameter for specifying the control data, i.e., the output signal y, subjected to the vibrator 2 as the controlled object.

1-4-3 Synthesis of Data Map

As is summarized in FIG. 5, data maps employed during the adaptable map control are generated and set as described below.

According to the embodiment of the present invention, data maps are generated and set, as appropriate, in response to the vehicle driving condition at the time when data maps are generated and set, by the data map setting unit C5 while the adaptive control has been performed by the system 1. The number of data maps is determined in accordance with the types of vehicle driving conditions.

Figure 5:
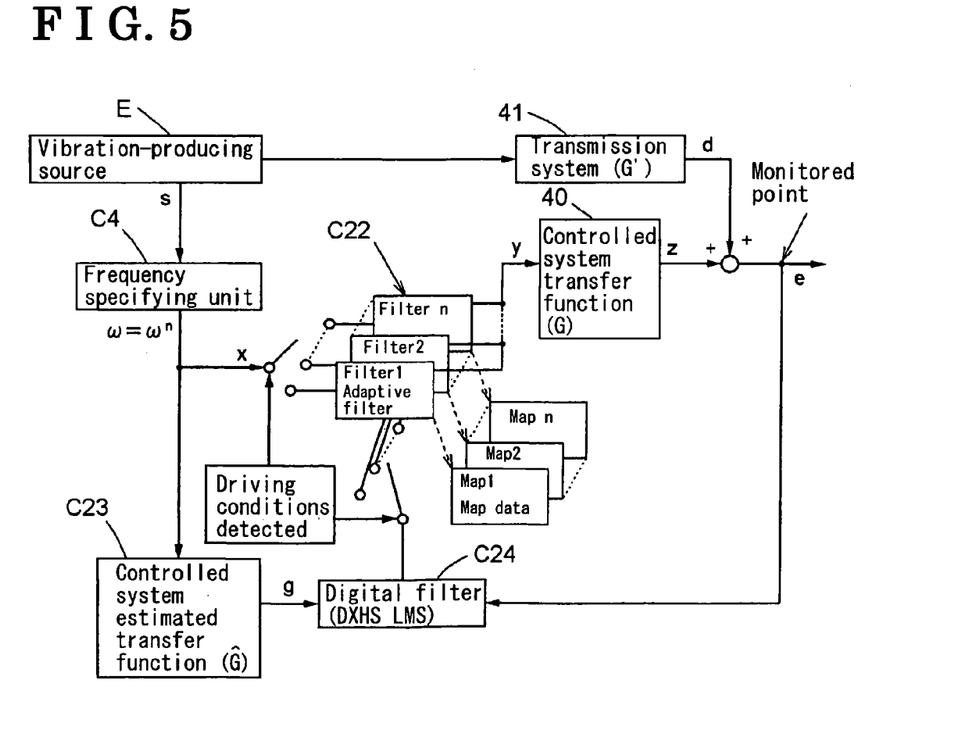
FIG. 5 is a block view schematically illustrating an algorithm for generating and setting data maps, which are needed for performing the adaptable map control, during implementing the adaptive control.

FIG. 5 explains an algorithm approach for generating and setting data maps by the system 1 during operation of the adaptive control. FIG. 5 corresponds to FIG. 4 in which the filter coefficient of the adaptive filter C22 is updated. As is obvious from FIG. 5, in the data map setting unit C5, an actual vehicle driving condition at the time when data maps are generated and set, can be specified, and the filter coefficient of the adaptive filter C22, which is updated during the adaptive control, is reflected on the data maps.

That is, when at least one of the shift position, the on-and-off state of the air-conditioning switch and the engine rotational frequency $\omega$ changes during performance of the adaptive control, the filter coefficient of the adaptive filter C22 is updated by the digital filter (DXHS LMS) C24. In such case, the filter coefficient of the adaptive filter C22 is updated in response to an actual vehicle driving condition. Therefore, the control data can be set and stored, in response to an actual vehicle driving condition, in the form of (amplitude, phase) corresponding to the updated filter coefficient of the adaptive filter C22.

Figure 6:
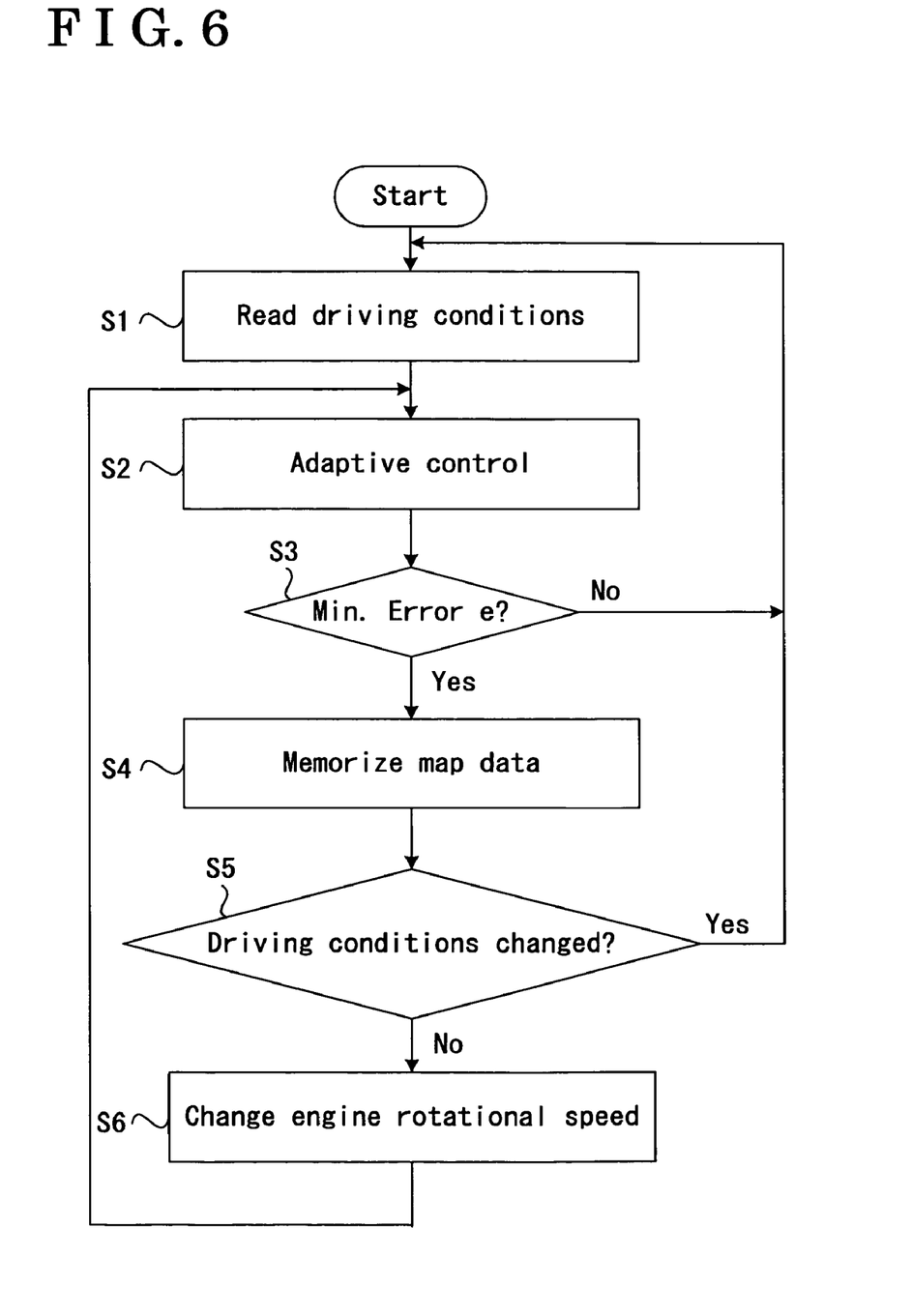
FIG. 6 is a flowchart for explaining generation and setting of data maps carried out by a data map setting unit according to the embodiment of the present invention.

FIG. 6 is a flowchart for explaining a process for generating and setting data maps by the data map setting unit C5.

At step S1, the data map setting unit C5 reads an actual vehicle driving condition. At step S2, the data map setting unit C5 performs the adaptive control according to the embodiment of the present invention. At this point, factors referred to as the vehicle driving condition are any shift position (D/N/R) and any on-and-off state of the air-conditioning switch. At step S3, the data map setting unit C5 determines whether the value of the error signal e is the minimum value or within a predetermined allowable range. When an affirmative answer "Yes" is obtained at step S3, i.e., when the value of the error signal 2 is determined to be the minimum value or within the predetermined allowable range, the program proceeds to step S4, wherein the updated filter coefficient of the adaptive filter C22 is stored as control data plopped on a data map specified on the basis of the actual vehicle driving condition. In such case, the filter coefficient of the adaptive filter C22 is stored in the form of (voltage amplitude, phase) or (current amplitude, phase). On the other hand, when a negative answer "No" is obtained at step S3, the program returns to step S1, wherein the adaptive control is repeatedly performed.

At step S5, the data map setting unit C5 determines whether the vehicle driving condition (a shift position and an on-and-off state of the air-conditioning switch) has changed. When a negative answer "No" is obtained at step S5, i.e., when the vehicle driving conditions have not changed, the program proceeds to step S6, wherein the engine rotational speed is changed. The program then returns to step S2 so as to perform the adaptive control. That is, the control data is compensated under the same vehicle driving conditions except for the engine rotational speed.

On the other hand, when an affirmative answer "Yes" is obtained at step S5, i.e., when the vehicle deriving condition has changed, the program returns to step S1. As described above, according to the embodiment of the present invention, the adaptive control can be carried out, and at the same time, control data, which corresponds to an updated filter coefficient of the adaptive filter C22, is stored, during the adaptive control, under various vehicle driving conditions.

According to the above-described embodiment of the present invention, the predetermined frequency, which is employed as a parameter to determine which control method should be performed, either the adaptive control or the adaptable map control, is set at 50 Hz as a non-limiting example. Alternatively, the control method can be switched, at a level of a different frequency, between the adaptive control and the adaptable map control.

According to the above-described embodiment of the present invention, the digital filter C24 employs the DXHS LMS algorithm. Alternatively, the digital filter C24 can employ an adaptive Least-Mean Square filter algorithm approach.

As described above, according to the embodiment of the present invention, when the engine rotational frequency ω is equal to, or less than, the predetermined frequency, it is possible to achieve significant vibration-isolation performance, by making the best use of characteristics of a conventional map control, characteristics which is practically superior responsibility, and by compensating for a drawback of a conventional map control, drawback which is inferior robustness.

Further, according to the embodiment of the present invention, appropriate control data can be modified. In such case, irrespective of the predetermined frequency, error between an actually detected value and the appropriate control data does not occur. Therefore, it is possible to secure significant vibration-isolation performance.

When the engine rotational frequency a is equal to, or less than, the predetermined frequency, insignificant modification is applied to the appropriate control data, whereby not damaging responsibility of the adequate map control algorithm approach. Therefore, it is possible to secure significant vibration-isolation performance.

Further, when the engine rotational frequency ω is equal to, or less than, the predetermined frequency, a deviation between the appropriate control data and the actually detected value is calculated. Therefore, even when an error between the appropriate control data and the actually detected data is generated, due to secular distortion, it is possible to secure significant vibration-isolation performance.

On the other hand, when the engine rotational frequency ω is greater than the predetermined frequency, adaptive control algorithm approach is employed. In such case, control data is calculated on the basis of actually detected data of an engine pulse. Therefore, it is possible to maintain adjustability relative to changes of driving conditions or secular distortion.

When the engine rotational frequency ω is equal to, or less than, the predetermined frequency, a deviation between data map value and actually detected value is calculated. In order to modify or compensate for appropriate control data by the deviation and in order to obtain control data, it is preferable to prepare a filter coefficient, wherein it is possible to easily adjust gain and attain significant vibration isolation performance.

The principles, the preferred embodiment and mode of operation of the present invention have been described in the foregoing specification. However, the invention, which is intended to be protected, is not to be construed as limited to the particular embodiment disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A method of setting control data used in an active vibration isolation control system for attenuating vibration of a vehicle in such a manner that the control data, which is based on a periodical pulse signal emanating from a vibration-producing source of the vehicle, is applied to an active mount which is attached with a vibrator and which is mounted on a vehicle, the method comprising:

using a control device which is associated only with the vehicle to set the control data selectively either by use of an adaptive control algorithm when a frequency of the pulse signal from the vibration-producing source of the vehicle is higher than a predetermined frequency or by selecting map-based control data from a data map for establishing a map-based control of the vibration when the pulse signal from the vibration-producing source of the vehicle is not higher than the predetermined frequency;

using the control device to calculate a deviation between the map-based control data and actually detected data representing the vibration at a specific position of the vehicle; and using the control device to modify the map-based control data on a basis of the calculated deviation, wherein the control data is compensated on a basis of the modified map-based control data.

2. The method according to claim 1, wherein the deviation is weighted by a filter coefficient.

3. The method according to claim 2, wherein the filter coefficient is variable.

4. The method according to claim 3, wherein the filter coefficient is set to be a finite value equal to or less than 0.2, other than 0.

5. The method according to claim 1, wherein the map-based control data is selected in accordance with a current vehicle driving condition, and wherein the current vehicle driving condition is determined on a basis of at least one of: an engine rotational frequency; any shift position of a transmission; and any on-and-off state of an air-conditioning switch, or on a basis of a combination of the engine rotational frequency, any of the shift positions of the transmission and any of the on-and-off states of the air-conditioning switch.

6. The method according to claim 1, wherein the predetermined frequency is set within a range between 40 Hz and 65 Hz.

7. The method according to claim 6, wherein the predetermined frequency is set at 50 Hz.

8. The method according to claim 1, wherein the actually detected data representing the vibration at the specific position of the vehicle is detected by a detecting unit and has an output form consisting of actual amplitude and actual phase in terms of voltage.

* * * * *